July 19, 1949.    A. L. RICORDEL    2,476,625
SIGHTING APPARATUS FOR ASCERTAINING THE VELOCITY
AND DIRECTION OF MOVEMENT OF AERIAL TARGETS
Filed Nov. 17, 1934    6 Sheets-Sheet 1

INVENTOR:
AUGUSTE LOUIS RICORDEL
By Allan Hall
his Attorney

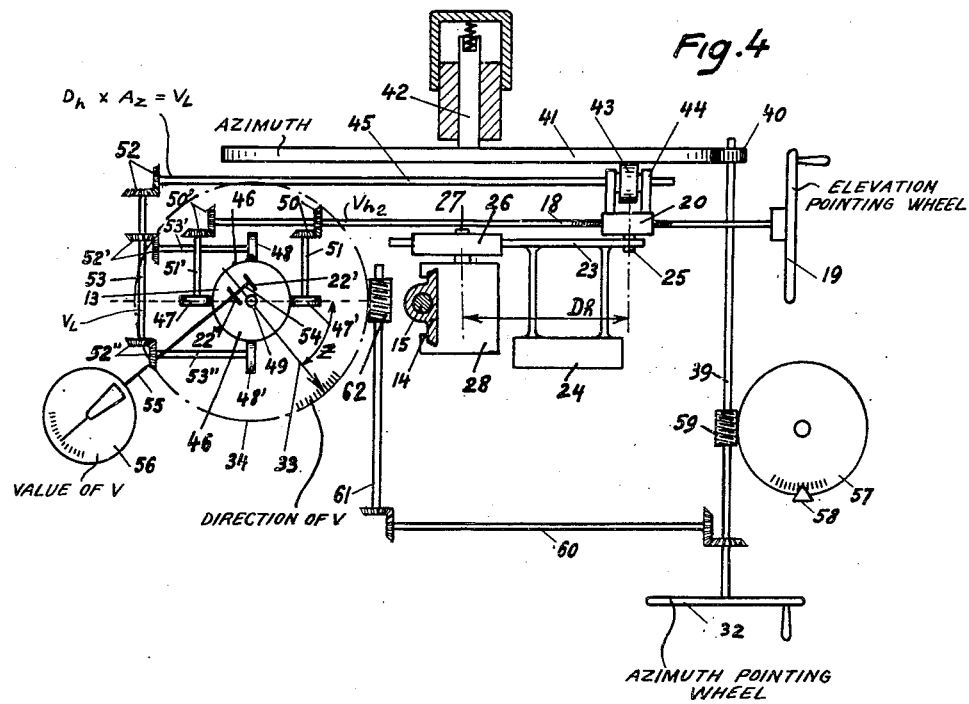

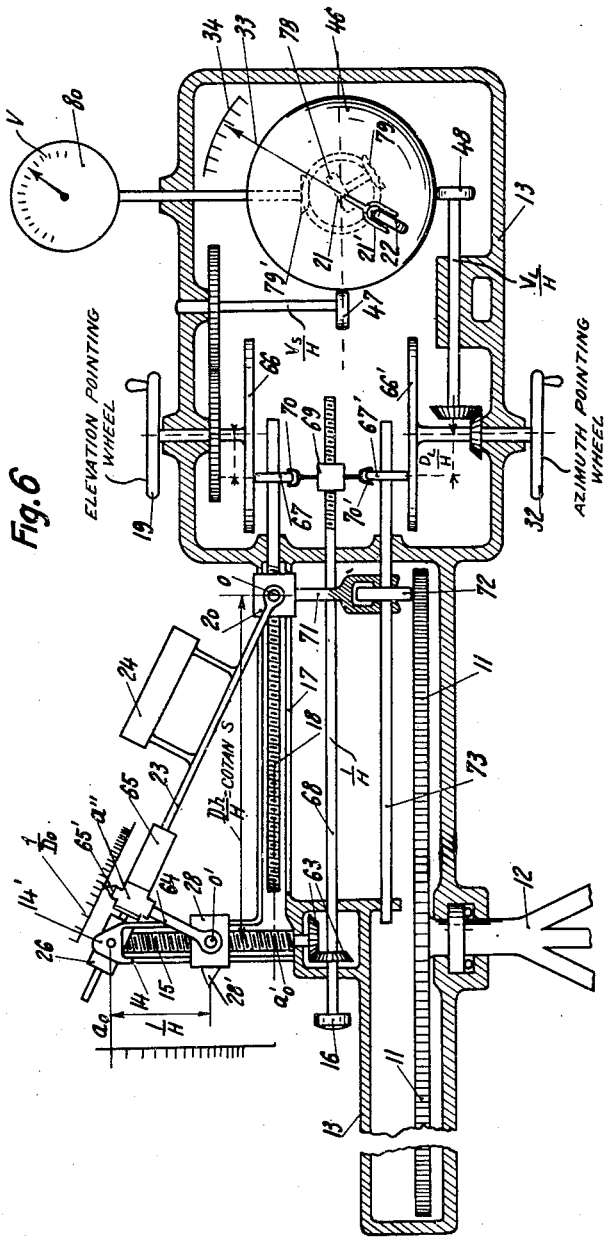

INVENTOR:
AUGUSTE LOUIS RICORDEL
By Allan Hall
his Attorney

July 19, 1949.                A. L. RICORDEL                 2,476,625
              SIGHTING APPARATUS FOR ASCERTAINING THE VELOCITY
                 AND DIRECTION OF MOVEMENT OF AERIAL TARGETS
Filed Nov. 17, 1934                                    6 Sheets-Sheet 5

INVENTOR:
AUGUSTE LOUIS RICORDEL
By Allan Hall
his Attorney

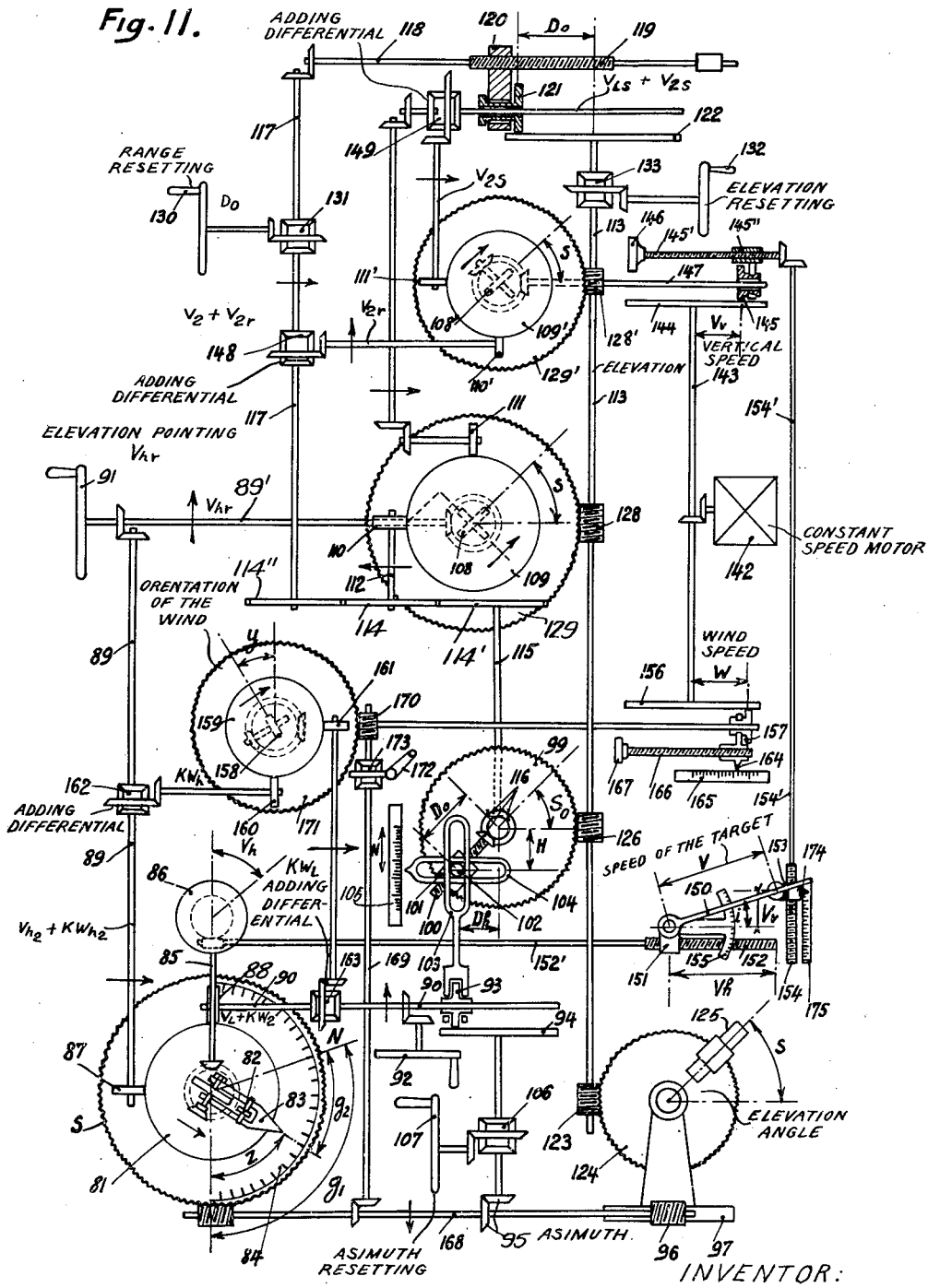

Patented July 19, 1949

2,476,625

UNITED STATES PATENT OFFICE 2,476,625

SIGHTING APPARATUS FOR ASCERTAINING THE VELOCITY AND DIRECTION OF MOVEMENT OF AERIAL TARGETS

Auguste Louis Ricordel, Paris, France, assignor to the society said La Precision Moderne, Paris, France, a body corporate of France Application November 17, 1934, Serial No. 753,547
In France November 18, 1933

Section 3, Public Law 690, August 8, 1946
Patent expires November 18, 1953

5 Claims. (Cl. 235—61.5)

The invention relates to an auxiliary pointing apparatus by means of which the speed and direction of movement of a moving target may be determined and which is particularly applicable to anti-aircraft firing.

It is known that in anti-aircraft firing three elements are needed for effecting the corrections as to altitude and horizontal displacement of the target; these three elements are the range, the speed, and the direction of movement of the target. The first of these elements is ascertained with precision by telemetric measuring, but the speed is generally merely estimated according to the type of the aircraft and the direction of movement is assumed by guess-work of the gunner which results in considerable error. In other cases, the values of the speed and direction of movement of the aircraft are ascertained by a number of observations and calculations which consume a fairly considerable time. This is a great drawback, particularly in cases when the aircraft changes its direction frequently in order to avoid being hit by anti-aircraft artillery projectiles.

The present invention has for its object an apparatus adapted to eliminate these drawbacks and to make available at any moment and continuously precise data on the speed and direction of movement of the target; this apparatus is characterized by the feature that it comprises an orientable friction roller in constant contact with a bearing surface, means for displacing this roller relatively to the bearing surface in two, mutually normal directions, at velocities proportional to the horizontal components of the speed of the target in the plane of sighting (radial-horizontal component) and in a plane vertical thereto (lateral component), respectively, and means for deriving the values of said components from the displacements, in elevation and in azimuth, of the sighting device of the apparatus.

Two forms of embodiment of the apparatus constructed according to the invention are hereinafter described by way of example and illustrated in the accompanying drawing, in which:

Fig. 4 is a diagrammatic view of a first embodiment of the invention in which the orientable roller is mounted on a stationary pivot and rests on the surface of a rotating sphere.

Fig. 5 shows diagrammatically a device for determining the value of the horizontal range of the target on the basis of its telemetric range.

Fig. 6 is an elevational section of a modified embodiment of the apparatus shown in Fig. 4 equipped with the device shown in Fig. 5.

Fig. 11 shows a modification incorporating a device such as shown in Figs. 9 and 10.

Let O (Fig. 1) be the location of the gun $A_0$ the position of the target at a given moment; it will be supposed that the target remains at a constant altitude during the time of sighting, so that its speed may be represented by a vector $A_0A$ in a horizontal plane P which is at a distance $A_0A'_0=H$ from the horizontal plane P' passing through the point O. The vector $A_0A$ may be resolved into two vectors one of which, $A_0B=V_{hr}$, is in the plane of sighting $A_0OA'_0$, and the other, $AB=V_L$, in a plane normal to that plane and lying in the "P" plane. The projection of these two vectors onto the horizontal plane P' are shown at $A_0'B'$ and at $A'B'$, and it will be seen that the radial-horizontal component, $A_0B=A'_0B'$, is equal to the rate of change of the horizontal distance $OA'_0=D_h$ of the target, whereas the lateral component, $AB=A'B'$, is equal to the product of that horizontal distance and the angular velocity in azimuth $A'_0OA'=W_a$ of the target. It is sufficient, therefore, in order to obtain these two components, to know at any moment the horizontal distance $D_h=OA'_0$ (the radial speed $A_0B$, or $A'_0B'$, is the variation of $D_h$ during the unit of time), which is easily derived from the angle of altitude $A_0OA'_0=S$ and from the altitude $A_0A'_0=H$ or from the telemetric distance $OA_0=D_0$, whilst the lateral component $V_L$ is derived from the horizontal range and from the angular azimuth displacement $W_a$. The desired value $A_0A$ of the speed of the target is obtained by combining the vectors $A_0B$ and $AB$.

Figure 2:
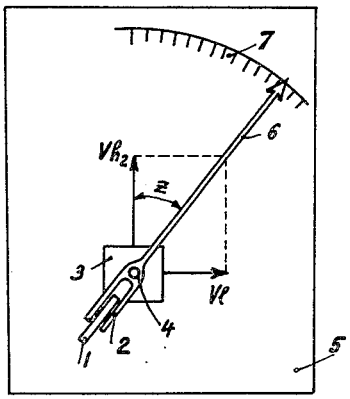
Figure 3:
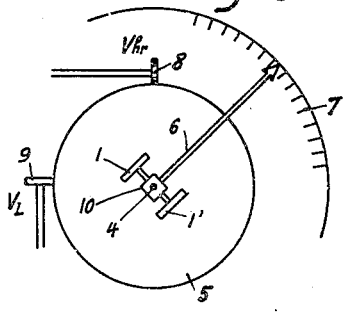

The recomposing of the vectors $V_{hr}$ and $V_L$ is effected according to this invention, by means of a device operating on the principle illustrated in Figs. 2 and 3. This device comprises a roller 1 mounted in a fork shaped member 2 pivoted on a pin carried by a supporting member 3 in respect to which said roller 1 has an eccentric position. The roller 1 rests on a bearing 5. When the supporting member 3 is displaced in respect to the fixed bearing surface 5 simultaneously in two directions at right angles to each other at velocities proportional to $V_{hr}$ and to $V_L$, respectively, the roller is set according to the direction of the resultant of these two vectors, so that a hand 6 integral with the fork shaped member 2 and moving over a graduated dial 7 integral with the supporting member 3, indicates the angle made by the direction of movement of the aircraft with the plane of sight $A_0OA'_0$. It is understood that instead of pivoting the roller 1 on a supporting member movable in respect to a fixed bearing surface, the pivoting axis 4 may be fixed and the bearing surface may be displaced in two directions at right angles to each other. Thus, in Figure 3, this movable bearing surface 5 is constituted by a sphere (supported by a ball or a disk) driven in rotation by two driving rollers 8 and 9 contacting with a horizontal great circle of said sphere and set at 90° from each other and rotating at velocities respectively proportional to $V_{hr}$ and to $V_L$, whereas the receiving train is constituted by two rollers 1, 1' mounted on a supporting member 10 pivoted around an axis in line with the vertical diameter 4 of the sphere. Such a disposition has the advantage of permitting the use of greater velocities for driving the recomposing device and thus to eliminate the influence of inertia on the receiving train.

Figure 1:
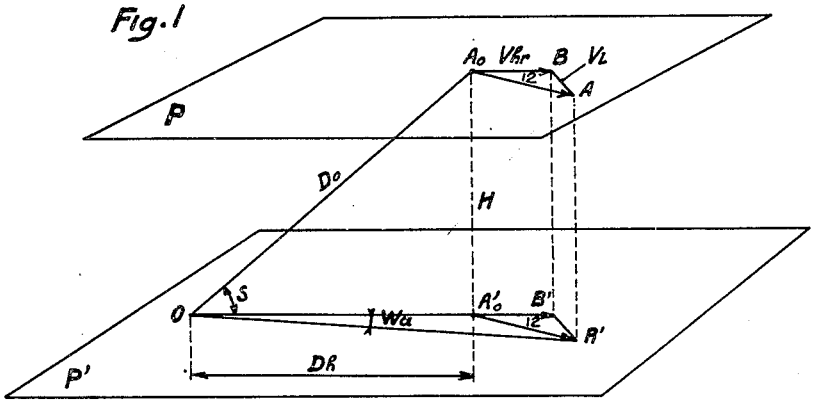
Figs. 1 to 3 are diagrams illustrating the principles on which the apparatus is based.

Fig. 4 is a plan view of the apparatus of which the principle has been diagrammatically illustrated in Figs. 1 to 3.

This apparatus comprises an assembly which may be rotated in azimuth and which forms a device providing a value proportional to the horizontal distance of the target, said device comprising an altitude setting screw 15 along which a nut 28 may be moved without rotation, a horizontal screw 18 along which a nut 20 may be similarly moved without rotation, an elevation pointing wheel 19 driving the screw 18 and a sighting tube 24 fixed on the rod 23 articulated on one hand at 25 on the nut 20 and sliding, on the other hand, in a socket 26 articulated at 27 on the nut 28 movable along the altitude screw 15.

When the altitude pointing wheel 19 is rotated so as to point the sighting tube upon the target, the distance between the axes 25 and 27, measured along the rod 23, is proportional to the range $OA_0=D_0$ (Fig. 1) of the target, whilst the distance between 25 and 27 measured in horizontal projection along the horizontal screw 18 is proportional to the horizontal range $D_h=OA'_0$. The variations of the horizontal distance between 25 and 27, i. e. the speed of the displacement of the nut 20 produced during sighting by the altitude pointing wheel 19, as well as the speed of rotation of the screw 18, is thus proportional to the radial-horizontal component $V_{hr}$ of the movement of the target.

The determination of the lateral component $AB=W_aD_h$ of the speed of the target is performed by means of the following members: an azimuth pointing wheel 32 driving in azimuthal rotation the rotatable device also drives by means of shaft 39 a small pinion 40 meshing with a vertical toothed plate 41, the shaft 42 of which is in the vertical plane of the axis 27. The angular displacements of this plate 41 are proportional to the variations of the azimuth of the target, i. e. to $W_a$; for obtaining the product $W_aD_h$ the nut 20 moving on the screw 18 driven by the altitude wheel 19 carries a vertical roller 43 by means of a supporting member 44, said roller being in contact with the plate 41. The distance from the point of contact of the roller 43 with the plate 41 to the centre of the latter being proportional to $D_h$, it is clear that the number of revolutions performed by the roller 43 is proportional to $W_aD_h$. This roller 43 is slidably keyed on a shaft 45 which drives, together with the shaft 18 controlled by the elevation wheel 19, the device for reconstructing the resultant speed vector. This device comprises a sphere 46 which is supported from below by a suitable supporting member such as a screw or a roller, on which it may freely rotate, and which is driven by two pairs of driving rollers 47—47', 48—48', whilst the orientable receiving train is constituted by two rollers 22'—22" pivoted around an axis in line with the vertical diameter 49 of the sphere 46.

The rollers 47—47' are placed in a plane parallel to the plane of sight and the rollers 48—48' in a plane normal to the former. The rollers 47—47' are driven by means of the bevel pinions 50—50' and of the shafts 51—51' by the shaft 18 actuated by the altitude pointing wheel 19, the rotation of which is, as explained above, proportional to the radial-horizontal component $V_{hr}$ situated in the plane of sight. The rollers 48—48' are driven by means of the pinions 52—52'—52" and of the shafts 53—53'—53" by the shaft 45 driven by the azimuth pointing wheel 32, the rotation of which provides the lateral component $V_L$ normal to the plane of sight.

A horizontal hand 33 moving as shown above over a dial 34 is fixed on the orientable receiving train perpendicularly to the axle 54 of the receiving rollers 22'—22". When the sphere is set into motion by the driving rollers 47—47' and 48—48', the axle 54 of the movable train is displaced azimuthally about the shaft 49 and reaches a position of equilibrium in which the rollers 22'—22" run at the same velocity. In that position the axle 54 is evidently parallel to the axis horizontal of rotation of the sphere 46 and the hand 33 indicates the direction of movement of the target. On the other hand, the rotation of the rollers 22'—22" is transmitted by a shaft or flexible cable 55 to a tachometer 56 which indicates on an appropriate graduation the magnitude of the speed of the airplane.

A graduated dial 57 movable in front of an index 58 is driven by the azimuth pointing wheel 32 by means of an endless screw 59, and indicates the azimuth of the sighting tube 24. The dial 34 is also driven in azimuthal rotation by the wheel 32 by means of the shafts 60, 61 and of the screw 62, so that the position of the hand 33 in respect to the dial 34 shows directly the direction of movement of the airplane, i. e. the angle formed by the course of the airplane with a fixed direction, for instance north-south.

The apparatus heretofore described and diagrammatically illustrated in Fig. 4 has, however, in practice, the following drawbacks:

Firstly, the continuous azimuth pointing wheel 32 which directly controls the azimuthal displacements of the sighting tube, rotates at a velocity equal to the angular azimuthal velocity of the target, which velocity is essentially variable depending on the range of the target, even when the linear speed of the airplane is constant. The continuous pointing is therefore difficult to perform with the same regularity for the different possible ranges of the target. On the contrary, the finding in direction of the target may be rapidly performed.

On the other hand, the fact that this radial-horizontal component of the speed of the target is obtained by the following up of the horizontal range in a device which requires that the altitude H be known, is very often obstructive as the telemeters do not always comprise means permitting to read directly the altitude H of the telemetered target.

Two different solutions will be hereinafter described which permit one to avoid the two above mentioned drawbacks, i. e. the necessity of knowing the altitude of the target and the irregular pointing in direction.

The first of these solution consists in materialising the triangle $A_0OA'_0$ of the Figure 1 not at a fixed scale, but at a variable scale of $$\frac{1}{H}$$

whilst keeping a constant value $$\frac{H}{H}=1$$

for the side of that materialised triangle which is represented by the screw of altitudes.

Let $a_0oa'_0$ (Figure 5) represent the right-angled triangle $A_0OA'_0$ (Fig. 1) reduced to the scale $$\frac{1}{H}$$

the sides of which will have therefore the following values:

$$a_0a'_0 = \frac{H}{H} = 1 \qquad oa_0 = \frac{D_0}{H} \qquad oa'_0 = \frac{D_h}{H}$$

If a length $a_0o'$ equal to $$\frac{1}{H}$$

is measured from the point $a_0$ along $a_0a'_0$, and if a perpendicular $o'a''$ is drawn from the point $o'$ onto $oa_0$, a triangle $o'a_0a''$ is obtained which is similar to $oa_0a'_0$ and the side $a_0a''$ of which is equal to $$\frac{1}{D_0}$$

Thus a simple means is provided for constructing at any moment the triangle $oa_0a'_0$; it suffices to dispose on a rod $a'_0a_0$ of constant length a movable slide on which is articulated a rod $o'a''$ carrying at its end $a''$ a socket in which slides the rod $oa_0$ carrying the sighting tube and a pointer moving over an inverse scale of ranges having its origin at the point $a_0$. By displacing the point $o$, as in the case of point 25 of Figure 4, the pointer $a''$ is brought in front of the graduation of the scale $$\frac{1}{D_0}$$

corresponding to the telemetric range. In the case when the tele-altimeter is provided, one may use the altitude by providing on the slide $o'$ a pointer movable over a scale $$\frac{1}{H}$$

parallel to $a_0a'_0$ and having its origin in $a_0$.

However, as the length $$oa'_0 = \frac{D_h}{H}$$

depends now on the altitude, the rotation speed of the altitude pointing wheel, controlling the displacements of the point $o$, becomes itself a function of the altitude; for eliminating this drawback, said altitude pointing wheel controls, according to the invention, the displacements of the point $o$ by means of a change speed device controlled by the displacements of the slide $o'$ and reducing the rotation velocity of the wheel at the ratio of $$\frac{1}{H}$$

so that the rotation velocity of said wheel remains proportional to the variations of the horizontal range $D_h$ of the target.

When the sighting tube 24, integral with the arm $oa_0$, is displaced in azimuth, the point $o$ describes a circle at a tangential linear velocity equal to $$W_a \times \frac{D_h}{H}$$

according to this invention, a change speed device, similar to the above, is arranged between the azimuth pointing wheel and the driving members of the sighting tube, said device reducing the speed of the azimuth pointing wheel at the ratio of $$\frac{1}{H}$$

the rotation velocity of this wheel will therefore be proportional to:

$$W_a \times \frac{D_h}{H} \times H = V_L$$

i. e. to the lateral linear speed of the target which for a given path and speed of the airplane is independent of the range, so that the second drawback, explained above, of the apparatus according to Fig. 4, is thus completely eliminated.

Fig. 6 shows a form of embodiment of the apparatus comprising the improvement, the principle of which has just been explained. This apparatus comprises a fixed circular horizontal plate 11 around the vertical shaft 12 of which may rotate in azimuth a frame 13 carrying the sighting tube 24, the altitude and azimuth pointing wheels 19 and 32 respectively and the combining sphere 46. An altitude screw 15 controlled by the knob 16 by means of bevel pinions 63 journalled in the frame 13 is disposed along the axis of the plate 11, and along this endless screw is displaced without rotation a nut 28 guided by the slide 14 and provided with a pointer 28' moving over a scale graduated in $$\frac{1}{H}$$

On the nut 28 is articulated an arm 64 having in extension of its end a pointer 65' movable in front of a scale graduated in $$\frac{1}{D_0}$$

and traversing a long guiding socket 65, the axis of which is perpendicular to the arm 64 carrying it, and in which slides the rod 23 carrying the sighting tube 24; one end of this rod 23 slides, as mentioned above, in a socket 26 articulated on a cap 14' situated at the upper end of the slide 14 guiding the nut 28 of the altitude screw 15, whilst the other end of the rod 23 is articulated on a nut 20 movable along the horizontal screw 18 journalled in the arm 17 of the orientable frame 13. The screw 18 is controlled by the wheel 19 by means of a change speed device comprising a plate 66 and a friction roller 67 slidably keyed on the extension of the screw 18 and the eccentricity of which in respect to the centre of the plate 66 is constantly maintained equal to $$\frac{1}{H}$$

For that purpose, the knob 16 controlling the displacements of the nut 28 along the screw of altitudes, drives also a shaft 68 on the threaded portion of which is engaged a nut 69 controlling, for instance by means of a fork shaped member 70, the displacements of the roller 67 along a radius of the plate 66 driven by the wheel 19.

If, therefore, the wheel 19 rotates at a velocity proportional to $V_{hr}=dD_h$, the rotation velocity of the screw 18 and therefore also the displacement velocity of the nut 20 will be proportional to $$\frac{dD_h}{H}=\frac{V_{hr}}{H}$$

and the sighting tube 24 will be correctly pointed in elevation.

The nut 20 carries by means of the member 71 a friction roller 72 contacting with the fixed plate 11 and slidably keyed on a shaft 73 journalled in the frame 13 and parallel to the horizontal screw 18. The shaft 73 is controlled by the azimuth pointing wheel 32 by means of a change speed device comprising a plate 66' and a roller 67', controlled itself, exactly as in the case of the similar device 66—67, by the altitude setting screw 15. When the azimuth pointing wheel rotates at a speed proportional to $$V_L = W_a \times D_h$$

the orientable frame 13 and the sighting tube 24 which it carries rotate in azimuth in respect to the fixed plate 11 at an angular velocity proportional to $W_a$, so as to maintain the sighting tube 24 correctly pointed in azimuth.

The altitude pointing wheel 19 and the azimuth pointing wheel 32, rotating as indicated above, at velocities respectively proportional to $V_{hr}$ and $V_L$ respectively, drive two rollers 47, 48 (or two pairs of rollers, as shown in Figure 4) the axles of which are horizontal and which are set at right angles to each other and in contact with a great circle of the sphere 46 resting on a screw or on an orientable roller on which said sphere may freely rotate.

The receiving roller 22 mounted in the fork shaped member 21' pivoted around an axis in line with the vertical diameter 21 of the sphere, will be set, as this has been explained above, together with the hand 33 which is integral with it, to indicate the direction with respect to the sighting plane of movement of the airplane on the graduated dial 34.

In order to obtain the numerical value of the speed of the target, the rotation velocity of the disc 22 or, which is the same, the resultant rotation velocity of the sphere 46, is measured. For that purpose, the sphere 46 rests by the lower end of its vertical diameter 21 on a directible roller 78 which thus forms a bearing point; this roller is integral with a bevel pinion 79 which, by means of bevel pinions 79', drives the shaft of a tachometer 80.

Figure 7:
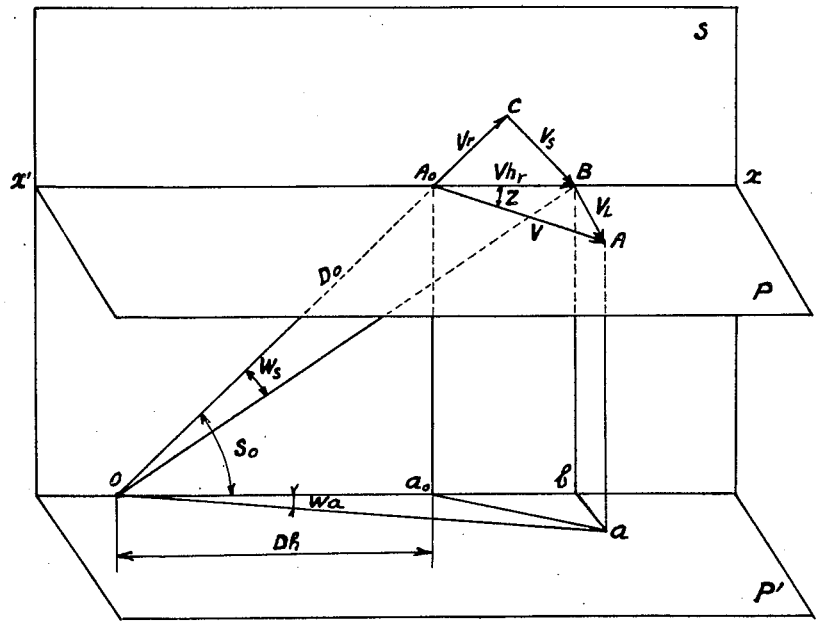
Figs. 7 and 8 are diagrams illustrating another manner of resolving the speed vectors for obtaining the horizontal range of a target on the basis of its telemetric range.
Figure 8:
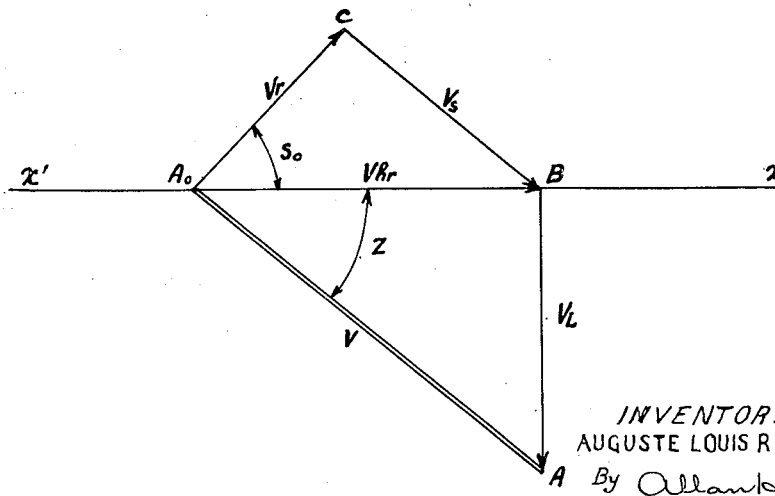

The second solution permitting to eliminate the aforementioned drawbacks of the apparatus according to Fig. 4, is based on the transformation of the radial-horizontal speed of the target into an angular resolved speed, the principle of which is represented in the diagrams of Figs. 7 and 8.

Let $A_0$ (Fig. 7) be the actual position of the target situated at a distance $OA_0=D_0$ from the pointing apparatus, said target moving at a speed $A_0A=V$ contained in the horizontal plane P, whereas the altitude of the airplane is assumed to be constant. The speed V may be decomposed into two vectors, one of which, $A_0B=V_{hr}$, situated in the plane of sight S, is the radial-horizontal speed, and the other, $AB=V_L$, normal to the former and situated in the plane P, is the lateral speed of the target. The component $V_{hr}$ may in turn be decomposed into two vectors, one of which, $A_0C=V_r$, directed according to $OA_0$ is the radial speed, and the other, $CB=V_s$, normal to $A_0C$ is the sital speed.

By projecting the triangle $A_0AB$ onto the plane of sight S about the line $x'x$, one obtains the polygon $A_0ABC$ which has to be constructed for determining the value V of the speed and the orientation angle Z of the target.

The angle $A_0OB=w_s$ (Fig. 7) is the angular elevational speed, and the angle $a_0Oa=w_a$ ($a_0ab$ being the projection onto the horizontal plane containing the point O of the triangle $A_0AB$) is the angular azimuthal speed of the target; these are therefore the angular components in the plane S and in the plane P' of the movement of the sighting tube.

The following relations evidently exist between these various values:

$$w_s=\frac{V_s}{D_0} \qquad w_a=\frac{ab}{D_0 \cos S_0}=\frac{V_L}{D_h}$$

$S_0$ being the elevation angle and $D_h$ the horizontal range of the target.

It is therefore seen that in order to drive the sighting tube or tubes by means of pointing wheels rotating proportionally to $V_{hr}$ and to $V_L$, it will be necessary, the initial distance $D_0$ being provided by the rangefinder, to perform the following operations:

First, to transform $D_0$ into the horizontal range $$D_h = D_0 \cos S_0 \qquad (1)$$

Second, to transform the lateral speed $V_L$ into an angular azimuthal speed according to the relation $$w_a=\frac{V_L}{D_h} \qquad (2)$$

Third, to resolve the radial-horizontal velocity $V_{hr}$ of the altitude pointing wheel into the radial velocity $V_r$ and elevational velocity $V_s$; (3)

Fourth, to transform the linear elevational velocity $V_s$ into angular elevational velocity according to the relation $$w_s=\frac{V_s}{D_0} \qquad (4)$$

Finally, in order that all these operations shall be continuous, it is necessary to follow up the values of the range $D_0$ and of $S_0$ which are furnished to the devices permitting to obtain $D_h$ and $w_s$ according to (1) and (4); for the following up of $D_0$ one will use the radial velocity $V_r$ found as per (3), and for the following up of $S_0$, the angular elevational velocity $w_s$.

Figure 9:
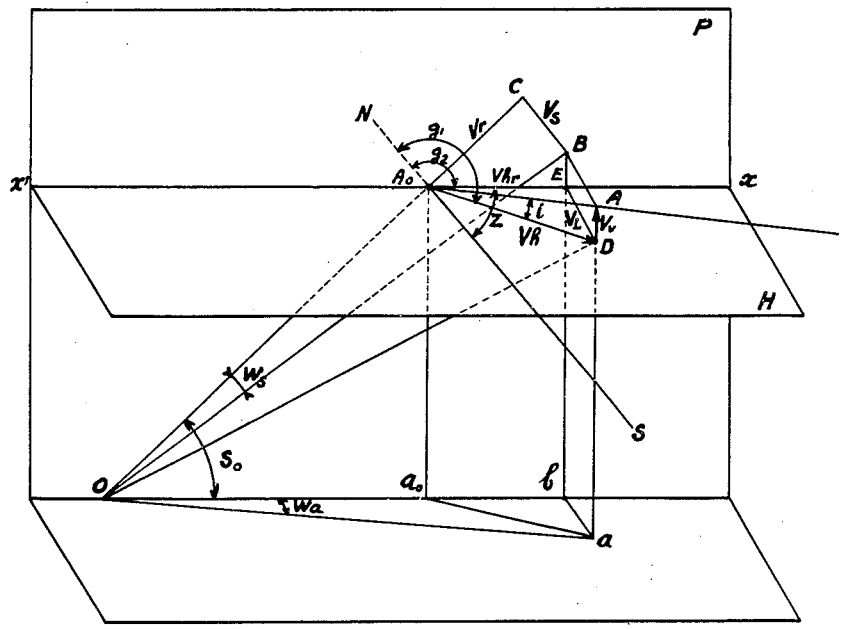
Figs. 9 and 10 are diagrams illustrating the resolution of the speed vectors taking into account the variations of altitude of the target.
Figure 10:
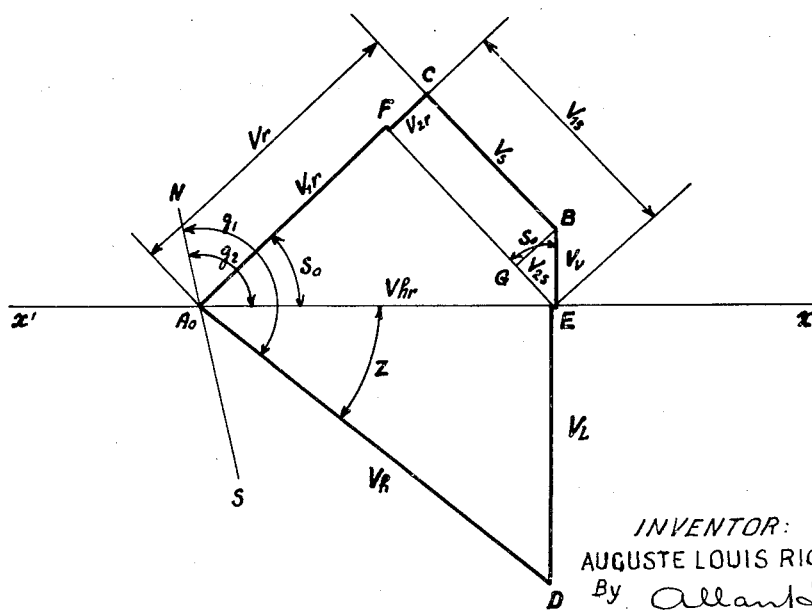

The diagrams of Figures 9 and 10 correspond to the case where the speed $V=A_0A$ of the airplane is not in a horizontal plane, but is inclined by an angle $i$ in respect of the horizontal plane P.

This speed V may be resolved into a vertical speed $AD=BE=V_v$, and into a horizontal speed $A_0D=V_h$, and the problem consists in determining, in magnitude and in direction, the horizontal speed $V_h$, whereas the vertical speed $V_v$ may be either estimated at sight or measured in any known way, for instance by means of an altitudegraph.

The horizontal speed $V_h$ may be resolved as in the previous case, into a radial-horizontal speed $V_{hr}=A_0E$ and a lateral speed $V_L$ may be determined as above from the horizontal distance $D_h$ and from the angular velocity of pointing in azimuth $w_a$.

In order to take into consideration the inclination $i$ of the course of the airplane, the radial-horizontal speed is resolved into three vectors: EB, which is the vertical speed $V_v$ of the target, BC, which is the elevational speed $V_s$, and $A_0C$, which is the radial speed $V_r$.

Figure 10, in which the triangle $A_0ED$ has been turned about the axis $x'x$ onto the plane of sight S, permits one to understand more easily the principle according to which the apparatus will be constructed. It is seen from this figure that, if no account were taken of the inclination of the speed of the target, the radial-horizontal speed $A_0E=V_{hr}$ would be resolved according to Figure 8 into an elevational speed $EF=V_{1s}$ and into a radial speed $A_0F=V_{1r}$. In order to take into account the variation of altitude, the vertical speed $EB=V_v$ is resolved into two vectors respectively parallel to $A_0F$ and $EF$, and thus are obtained the elevational and radial components $V_{2s}=EG$ and $V_{2r}=FC$, which, by being added to or subtracted from $V_{1s}$ and $V_{1r}$, give the true values $V_s=BC$ and $V_r=A_0C$ of the elevational and radial speeds of the target. It is, therefore, clear that in order to take into account the variation in altitude of the target, it is simply necessary to provide the apparatus with a device for resolving the vertical speed vector into its sital and radial components.

Such an apparatus is represented in Figure 11.

This apparatus comprises a sphere device similar to those of Figs. 4 and 6 and comprising the sphere 81, the two driving rollers 87, 88 rotating at speeds proportional to the components $V_{hr}$ and $V_L$ of the speed V of the airplane and the receiving roller 82 with its index 83 on the gradation 84. The driving rollers 87, 88 are actuated directly by the wheels 91 for elevation pointing and 92 for azimuth and control the sighting tube connected thereto by shafts 89, 90.

The shaft 90 controlled by the azimuth pointing wheel 92 drives on the other hand the roller 93 adapted to slide along said shaft, and driving by friction a plate 94, the rotation of which is transmitted by the bevel pinion 95, the shaft 168, the endless screw 96 and the tangential wheel 97 to the sighting tube 125. The roller 93 is constantly maintained at a distance from the centre of the plate 94 which is proportional to the horizontal range $D_h$ of the target by means of a device constituted by a rotating plate 99 on which is journalled a screw 100, on which is engaged a nut 101 carrying a finger 102 engaged in two slides 103, 104 set at right angles. By means of devices which will be hereinafter described, the finger 102 is constantly maintained at a distance from the centre of the plate 99 which is proportional to the telemetric range $D_0$, and the screw is pointed in elevation by the rotation of said plate, so that the distances of the axes of the slides 103, 104 from the centre of the plate are proportional to the horizontal range $D_h$ and to the altitude $H_0$ of the target respectively. The altitude $H_0$ is shown on a scale 105 by a pointer integral with the slide 104, whereas the slide 103 controls the displacements of the roller 93.

When the sighting tube 125 follows the target in a continuous manner, the plate 94 rotates at a velocity proportional to $w_a$, so that the roller 93 and consequently the shaft 90, the wheel 92 and the driving roller 88 of the sphere 81 rotate at a velocity proportional to $w_aD_h=V_L$, which is the desired result.

A differential 106, the satellite drum of which is driven by the wheel 107, is arranged between the plate 94 of the change speed device described above, and the sighting tube 125, said differential permitting a rapid azimuthal resetting of the sighting tube to be performed.

The wheel for continuous elevation pointing, 91, drives by means of a shaft 89' the driving roller 108 of a resolving sphere 109, said roller 108 being adapted to be oriented in a manner to form with the plane of one of the receiving rollers 110 or 111 an angle equal to the angle of elevational. If it is supposed that this roller is oriented according to the initial angle of elevation $S_0$ and that it is driven by the wheel 91 at a velocity proportional to the radial-horizontal speed $V_{hr}$ of the airplane, it will be seen that the roller 110 will rotate at a velocity proportional to the radial speed $V_r=V_{hr} \cos S_0$, and the roller 111 at a velocity proportional to the elevational speed $V_s=V_{hr} \sin S_0$ of the target. The rotation of the roller 110 is used, on one hand, for following up the range $D_0$ in the device providing the horizontal range $D_h$ and, for this purpose, said roller 110 controls, by means of a shaft 112 and the pinions 114, 114', a shaft 115 which drives in rotation, by means of the bevel pinions 116, the range setting screw 100, causing thus the displacement along this screw of the nut 101 controlling the slides 103, 104; the rotation of the roller 110 is used, secondly, for controlling, by means of pinion 114' and shafts 117 and 118, an endless screw 119 driving a nut 120 which controls the eccentricity of a roller 121 of a change speed device comprising a plate 122, said roller 121 being driven in rotation by the roller 111 of the resolving sphere 109 and the plate 122 being connected by means of a shaft 113, the endless screw 123 and the toothed wheel 124 with the sighting tube 125.

When the sighting tube follows the target in elevation it moves at an angular velocity of $w_s$; the plate 122 rotates, therefore, at a velocity proportional to $w_s$ and, as the roller 121 is maintained at a distance proportional to $D_0$ from the centre of that plate 122, it rotates at a velocity proportional to $V_s=w_sD_0$, and this is also the case for the roller 111. It is, therefore, seen that when the wheel 91 is driven in a manner to follow the target, it actually rotates at a velocity proportional to the radial-horizontal speed $V_{hr}$ of the target.

The shaft 113 of the plate 122 carries, moreover, an endless screw 126, driving the plate 99, this resulting in the continuous resetting of the site of the range screw 100; said shaft carries an endless screw 128 meshing with a toothed wheel 129 which permits the continuous resetting of the orientation in site of the driving roller 108 of the decomposing sphere 109.

Similarly, the quick resetting of elevational of the range screw 100, of the roller 108 of the revolving sphere and of the sighting tube 125 is performed by means of a wheel 132 controlling the drum of satellites of a differential 133 mounted on the shaft 113 of the plate 122.

These rapid resetting wheels of range and of elevation 130 and 132, control their respective differentials by means of appropriate non-reversible transmissions which are not represented on the drawing (for instance by means of endless screws and tangential wheels), so as not to react upon one another.

In order to introduce the vertical speed vector $DA=V_v$, the apparatus comprises a motor of constant speed 142 controlling a shaft 143 on which is keyed the plate 144 of a change speed device, the roller 145 of which is maintained at a distance proportional to the vertical speed $V_v$ from the centre of the plate 144, this roller being controlled by a knob 146 by means of an endless screw 145′ and a nut 145″, the rotation of this screw being transmitted to a shaft 154′ provided with a threading 154 on which is engaged a nut 153 provided with an index 174 movable in front of a scale of vertical speed 175. This roller itself rotates therefore at a velocity proportional to $V_v$, and drives by means of its shaft a decomposing device 108′—109′—110′—111′, which is exactly similar to the device 108—109—110—111 heretofore described, and the driving roller 108′ of which is oriented in site, as the roller 108, by the shaft 113 of the change speed device 121—122, by means of the endless screw 128′ and of the toothed wheel 129′.

The components $V_{2s}$ and $V_{2r}$ provided thus by the rollers 110′, 111′, are combined with the components $V_{1s}$ and $V_{1r}$ provided by the rollers 110, 111 by means of the adding differentials 148 and 149 mounted on the shafts of the rollers 110 and 111, and the drums of satellites of which are controlled by the rollers 110′ and 111′.

The composing sphere 81 provides, finally, the value and the direction of the horizontal component $V_h$ of the movement of the target. In order to reconstruct the speed vector V, a device is provided which comprises a rod 150 articulated by one of its ends on a nut 151 engaged on a threaded portion 152 of a shaft 152′ controlled by the tachometer 86; the other end of the rod 150 rests freely on the nut 153 (or slides in a socket articulated on that nut) which is engaged, as heretofore explained, on the threaded portion 154 of the shaft 154′ controlled by the radial displacements of the nut 145. It is, therefore, clear that the length of the rod 150 comprised between the nuts 151—153 gives the length of V, whereas the angle formed by that rod with the shaft 152, angle shown on the graduated sector 155, gives the inclination $i$.

The wind-correction is performed according to this invention by resolving the speed of the wind into two vectors, one situated in the plane of sight and the other in a vertical plane normal to the plane of sight, and by adding these two components respectively to the radial-horizontal speed $V_{hr}$ and to the lateral speed $V_L$, controlling the recomposing sphere 81. For that purpose, the shaft 143 driven by the constant velocity motor 142 controls the plate 156 of a change speed device, the roller 157 of which is constantly maintained at a distance from the centre of the plate 156 which is proportional to the speed $w$ of the wind. This roller 156 controls the driving roller 158 of a decomposing sphere 159, the receiving rollers 160, 161 of which rotate, therefore, at the velocities $W_r$ and $W_L$ and control the drums of satellites of the adding differentials 162, 163 mounted on the shafts 89 and 90 of the rollers 87 and 88 of the sphere 81, respectively. The roller 157 is controlled in radial displacement by a nut 164 carrying a pointer movable in front of the speed scale 165, said nut being engaged on a screw 166 controlled by hand by means of the knob 167.

The driving roller 158 of the sphere 159 is oriented to form with the plane of the roller 160 the angle $y$ which is formed by the direction of the wind with the plane of sight; this orientation of the roller is continuously reset by the azimuthal displacements of the sighting tube by means of the shafts 168, 169, of the endless screw 170 and of the toothed wheel 171, whereas the initial setting of the angle $y$ is performed by the handle 172 controlling the drum of the differential 173.

In order to facilitate this operation of wind-correction, these angles are counted from the direction north-south by driving in azimuth the graduation 84 in front of which moves the index hand 83 of the recomposing sphere 81. This graduation 84 gives therefore directly and at every moment the direction $g_1$ of the plane of sight and the angle $g_2$ formed by the course of the airplane with the direction north-south.

A device similar to the one described above for the wind correction may be provided for performing the correction of the displacements of the shooter.

I claim:

1. Auxiliary sighting apparatus for ascertaining the velocity and direction of movement of an aerial target, comprising in combination a sighting tube, two wheels for controlling, respectively, the displacements in elevation and in azimuth of said sighting tube, altitude setting means, a device actuated by said elevation control wheel and said altitude setting means for determining the horizontal range of the target, a device actuated by the azimuth pointing wheel for multiplying said horizontal range by the angular azimuthal displacement of said sighting tube, a sphere, a supporting member on which said sphere is adapted to rotate freely, two driving rollers contacting with a horizontal great circle of said sphere and set at 90° from each other, means for actuating one of said driving rollers by the elevation-controlling wheel, means for driving the other roller by a part of the said multiplying device, and an orientable receiving roller driven by said sphere.

2. Auxiliary sighting apparatus for ascertaining the velocity and direction of movement of an aerial target, comprising in combination, a frame adapted to rotate in azimuth, a vertical screw journalled in said frame, a nut adapted to move along said screw without rotating, a scale of altitudes parallel to said screw, an index hand carried by said nut and moving in front of said scale, a socket articulated on said nut, a horizontal screw journalled in said frame, a nut adapted to move along said horizontal screw without rotating, a sighting tube, a rod integral with said sighting tube, having one end articulated on said nut, movable along said horizontal screw and the other end sliding freely in said socket articulated on said nut movable on said vertical screw, an altitude-pointing wheel, means for rotating said horizontal screw by said altitude-pointing wheel, an azimuth-pointing wheel controlling the azimuthal rotation of said frame, a sphere, a supporting member on which said sphere may freely rotate, two driving rollers contacting with a horizontal great circle of said sphere and set at 90° from each other, means for directly transmitting to one of said driving rollers the rotation of said horizontal screw, means for transmitting to the second driving roller the rotation of said azimuth-pointing-wheel, said means comprising a change speed device constituted by a circular plate, a shaft perpendicular to said two screws journalled in said frame, said circular plate being adapted to rotate on said shaft, and a friction-roller adapted to be displaced in unison with said nut movable along said horizontal screw; an orientable receiving train, constituted by a fork shaped member pivoted about the vertical axis of said sphere and a roller mounted in said fork shaped member eccentrically in respect to the vertical axis of the sphere with which it contacts; a graduated dial, means for transmitting the rotation of said azimuth-pointing wheel to said dial, an index hand carried by said receiving train and moving over said dial, and a tachometer for measuring the resultant velocity of rotation of said sphere.

3. Auxiliary sighting apparatus for ascertaining the velocity and direction of movement of an aerial target, comprising in combination a sighting tube, an altitude-pointing wheel, an azimuth-pointing wheel, means for transmitting rotation to said sighting tube from said pointing wheels during sighting at velocities proportional to the elevation and azimuth velocities, respectively, of the target; a sphere, a supporting member on which said sphere is adapted to rotate freely, two driving rollers contacting with a horizontal great circle of said sphere and set at 90° from each other, means for transmitting rotation to said driving rollers from said pointing wheels at velocities proportional to the radial-horizontal and lateral components, respectively, of the target movement, and an orientable receiving roller driven by said sphere.

4. Auxiliary sighting apparatus for ascertaining the velocity and direction of movement of an aerial target, comprising, in combination, a sighting tube, two wheels controlling the displacements in altitude and in azimuth, respectively, of said sighting tube, a sphere, a supporting member on which said sphere may rotate freely, two driving rollers contacting with a horizontal great circle of said sphere and set at 90° in respect to each other, means actuated by said altitude- and azimuth-pointing wheels for driving said driving rollers at velocities proportional, respectively, to the radial-horizontal and lateral components of the speed of the target, an orientable receiving train comprising a fork-shaped member pivoted about the vertical axis of said sphere and a roller mounted in said fork-shaped member eccentrically in respect of the vertical axis of the sphere with which it contacts, a graduated dial, an index hand coacting with said receiving train and moving over the said dial, and a tachometer device for measuring the resultant velocity of rotation of said sphere.

5. Auxiliary sighting apparatus for ascertaining the velocity and direction of movement of an aerial target, comprising, in combination, a sighting tube, an altitude pointing wheel, an azimuth pointing wheel, transmission devices provided between said sighting tube and said pointing wheels adapted to transmit to the sighting tube the angular elevation and azimuth velocities of the target while the wheels are rotated at velocities proportional to the linear radial-horizontal and lateral components, respectively, of the movement of the target; a sphere, a supporting member on which said sphere is adapted to rotate freely, two driving rollers contacting a horizontal great circle of the sphere, set at 90° from each other, means for actuating one of said rollers by the altitude pointing wheel, means for actuating the other roller by the azimuth pointing wheel, and an orientable roller driven by said sphere.

AUGUSTE LOUIS RICORDEL.

REFERENCES CITED

The following references are of record in the file of this patent:

UNITED STATES PATENTS

| Number | Name | Date |
|---|---|---|
| 1,256,234 | Innes | Feb. 12, 1918 |
| 1,663,211 | McNab | Mar. 20, 1928 |
| 1,701,582 | Mengden | Feb. 12, 1929 |
| 1,757,597 | Smith | May 6, 1930 |

FOREIGN PATENTS

| Number | Country | Date |
|---|---|---|
| 712,016 | France | July 8, 1931 |